US009216921B2

(12) United States Patent
Troubounis et al.

(10) Patent No.: US 9,216,921 B2
(45) Date of Patent: Dec. 22, 2015

(54) SYSTEM AND METHOD FOR TREATING PROCESS WATER WITH SEPARATE SEPARATION OF GASES AND SOLIDS

(75) Inventors: George Troubounis, Munich (DE); Dieter Efinger, Kumhausen (DE); Bernhard Niemczyk, Weingarten (DE); Lucas Menke, Munich (DE)

(73) Assignee: Meri Environmental Solutions GMBH, Munich (DE)

( * ) Notice: Subject to any disclaimer, the term of this patent is extended or adjusted under 35 U.S.C. 154(b) by 851 days.

(21) Appl. No.: 13/378,162

(22) PCT Filed: Jun. 15, 2009

(86) PCT No.: PCT/EP2009/004284
§ 371 (c)(1),
(2), (4) Date: Feb. 28, 2012

(87) PCT Pub. No.: WO2010/145672
PCT Pub. Date: Dec. 23, 2010

(65) Prior Publication Data
US 2012/0145629 A1    Jun. 14, 2012

(51) Int. Cl.
*C02F 3/28* (2006.01)
*C02F 1/20* (2006.01)
(Continued)

(52) U.S. Cl.
CPC ... *C02F 3/28* (2013.01); *C02F 1/20* (2013.01); *C02F 1/24* (2013.01); *D21C 11/0085* (2013.01);
(Continued)

(58) Field of Classification Search
CPC ............... C02F 3/28; C02F 1/20; C02F 1/24; C02F 1/001; C02F 1/5236; C02F 1/56; C02F 1/66; C02F 5/00; C02F 9/00; C02F 2103/28; C02F 2209/03; C02F 2301/043; C02F 2301/063; D21C 11/0085; D21C 5/005; D21C 11/06
USPC .................. 210/603, 608, 623, 928, 252, 259
See application file for complete search history.

(56) References Cited

U.S. PATENT DOCUMENTS 4,839,052 A * 6/1989 Maree ........................... 210/603
5,798,043 A * 8/1998 Khudenko ..................... 210/603
(Continued)

FOREIGN PATENT DOCUMENTS

CN    101341098 A    1/2009
DE    4042224 A1    7/1992
(Continued)

OTHER PUBLICATIONS

Translation of the Second Office Action issued in Chinese Patent Application No. 200980160576.1, Issue No. 2013122501416750, dated Dec. 30, 2013.
(Continued)

*Primary Examiner* — Fred Prince
(74) *Attorney, Agent, or Firm* — Cook Alex Ltd.

(57) ABSTRACT

The invention relates to a method and a system for purifying process water, particularly for continuously purifying process water in the paper industry. The method comprises at least one process water treatment step, which comprises the following steps: a) an anaerobic purifying step, wherein process water to be purified is brought in contact with anaerobic microorganisms in an anaerobic reactor in order to decompose impurities present in the waste water, b) a first separating step, wherein gases present in the process water obtained in step a) are separated from said process water, and c) a second separating step, wherein solids present in the process water obtained in step b) are separated from the process water.

17 Claims, 3 Drawing Sheets

Figure 1:
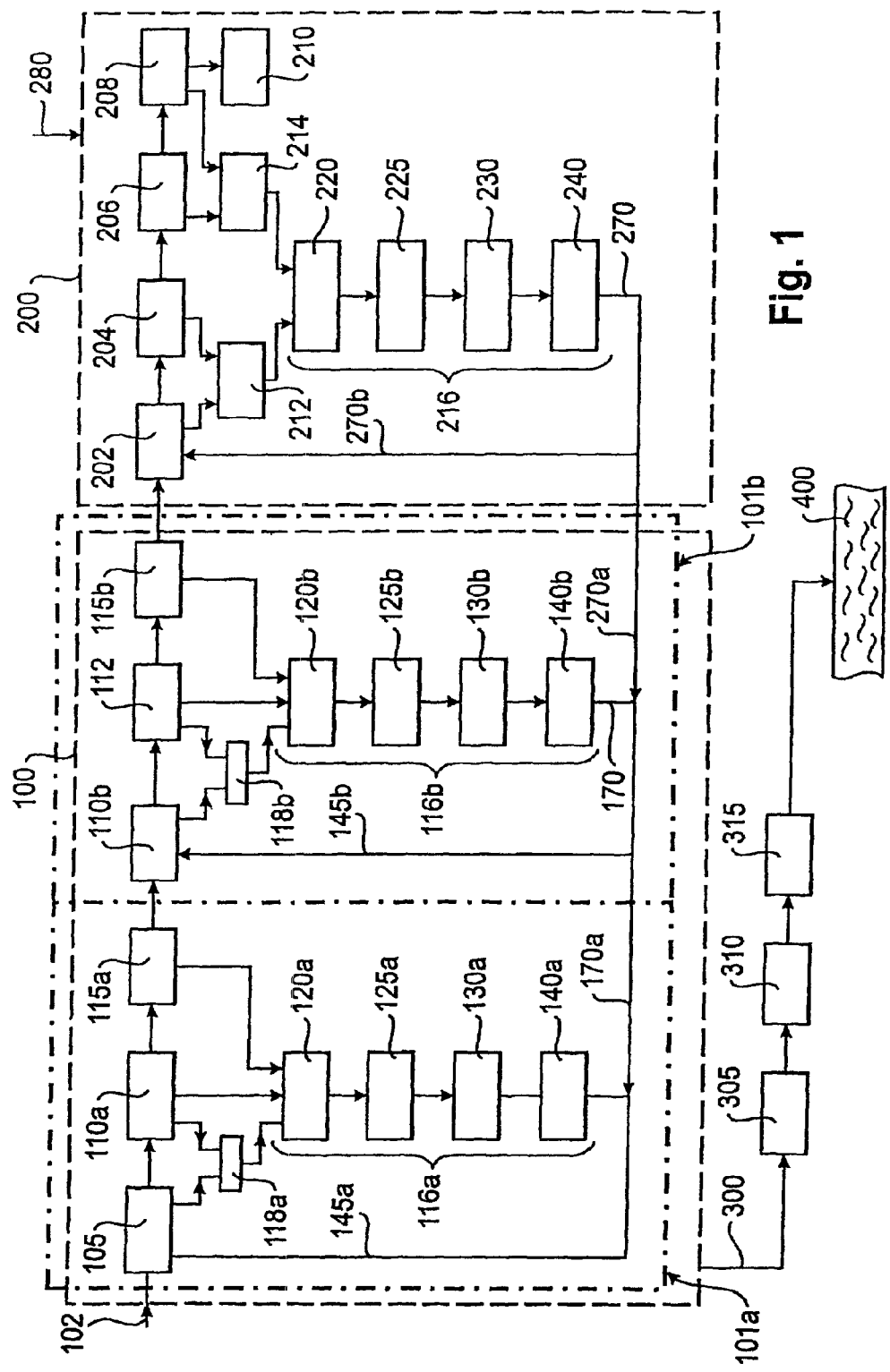

(51) Int. Cl.
  *C02F 1/24* (2006.01)
  *D21C 11/00* (2006.01)
  *C02F 1/00* (2006.01)
  *C02F 1/52* (2006.01)
  *C02F 1/56* (2006.01)
  *C02F 1/66* (2006.01)
  *C02F 5/00* (2006.01)
  *C02F 9/00* (2006.01)
  *C02F 103/28* (2006.01)
  *D21C 5/00* (2006.01)
  *D21C 11/06* (2006.01)

(52) U.S. Cl.
  CPC ............... *C02F 1/001* (2013.01); *C02F 1/5236* (2013.01); *C02F 1/56* (2013.01); *C02F 1/66* (2013.01); *C02F 5/00* (2013.01); *C02F 9/00* (2013.01); *C02F 2103/28* (2013.01); *C02F 2209/03* (2013.01); *C02F 2301/043* (2013.01); *C02F 2301/063* (2013.01); *D21C 5/005* (2013.01); *D21C 11/06* (2013.01); *Y02W 10/12* (2015.05)

(56) References Cited

U.S. PATENT DOCUMENTS

| | | | | |
|---|---|---|---|---|
| 6,464,875 | B1* | 10/2002 | Woodruff | 210/603 |
| 8,211,305 | B2 | 7/2012 | Menke et al. | |
| 2005/0109694 | A1 | 5/2005 | You et al. | |
| 2006/0150814 | A1* | 7/2006 | Goksoyr et al. | 95/263 |

FOREIGN PATENT DOCUMENTS

| | | |
|---|---|---|
| DE | 10256519 B4 | 8/2006 |
| DE | 102006036018 B3 | 1/2008 |
| DE | 102006060426 A1 | 6/2008 |
| DE | 102006060428 A1 | 6/2008 |
| EP | 0474895 A1 | 3/1992 |
| EP | 0695722 A1 | 2/1996 |
| EP | 1041044 A1 | 10/2000 |
| EP | 1120380 A2 | 8/2001 |
| EP | 1241140 A2 | 9/2002 |
| EP | 167356 A1 | 5/2006 |
| EP | 1884497 A2 | 2/2008 |
| KR | 20010038791 A | 5/2001 |
| KR | 20060125981 | 12/2006 |
| WO | WO9815686 | 4/1998 |
| WO | WO2007076943 A2 | 7/2007 |
| WO | WO2007076953 A1 | 7/2007 |
| WO | WO2008108599 A1 | 9/2008 |

OTHER PUBLICATIONS

PCT Notification of Transmittal of Translation of the International Preliminary Report on Patentability for PCT/EP2009/004284 dated Jan. 19, 2012.

Leo H.A. Habets & Heins J. Knelissen, "In Line Biological Water Regeneration in a Zero Discharge Recycle Paper Mill", Wat. Sci. Tech. vol. 35, No. 2-3, pp. 41-48, 1997.

Karl Roll, "Wasser. Nutzung im Kreislauf, Hygiene, Analyse and Bewertung. 8. Auflage", Walter de Gruyter, Berlin New York 2002, ISBN: 3-11-012931-0, pp. 750-752 (4 pages) with English Abstract.

* cited by examiner

SYSTEM AND METHOD FOR TREATING PROCESS WATER WITH SEPARATE SEPARATION OF GASES AND SOLIDS

This is a National Stage of PCT Application No. PCT/EP2009/004284, which was filed on Jun. 15, 2009.

The present invention relates to a method comprising at least one process water treatment step for purifying process water, in particular for continuously purifying process water in the paper-making industry, as well as to a system particularly suited for performing this method for purifying process water, in particular for continuously purifying process water in the paper-making industry.

A treatment of process water maybe particularly necessary in a number of technical fields where the process water is conducted in a circuit of a corresponding system to prevent an enrichment of the process water with interfering substances. This particularly applies to the process water in the manufacture of paper, and indeed both in the manufacture of paper from fresh fibers and in particular in the manufacture of paper from recovered paper, for example recovered waste paper.

Over the past decades, paper has been increasingly obtained from recovered paper to lower energy consumption in the manufacture of paper and in particular to reduce the consumption of natural resources. While around 2.2 metric tons (tonnes) of wood are required for the manufacture of a tonne of primary fiber paper, the wood requirements in paper recycling can be dramatically lowered or reduced to zero, depending on the proportion of the secondary fibers originating from recovered paper with respect to the total fiber amount in the recycled paper. In addition, only half as much energy and only a third of the fresh water is required in the production of recycled paper in comparison with the manufacture of paper from primary fibers. The quality of recycled paper is today nevertheless as high as that of primary fiber papers with respect to ink hold-out, printing behavior, degree of whiteness and aging resistance.

In the manufacture of paper from recovered paper, the recovered paper is first mixed with water and comminuted in a pulper or pulping engine while stirring and mixing to dissolve the individual fiber composites. Subsequently, a cleaning of the fibers takes place to remove non-fibrous foreign bodies from the fibrous pulp before the fibers are optionally whitened and are finally processed to paper on a paper-making machine, after the optional addition of a small proportion of primary fibers. A corresponding system consequently includes an apparatus for the treatment of recovered paper and a paper-making machine, with the recovered paper treatment apparatus comprising a recovered paper pulping unit or a pulper in which process water is supplied to the recovered paper for the pulping and comminution of the fibers, a sorting apparatus for the removal of impurities and a deckering unit for the removal of process water. It is also known to provide two or more recovered paper treatment apparatus or stages, so-called loops, in the system to increase the quality of the treated fibers from the recovered paper. Each loop of the recovered paper treatment apparatus and the paper-making machine in this connection preferably include their own process water treatment unit, with the individual process water treatment units being able to be decoupled from one another by a deckering unit provided between the individual loops.

To be able to conduct the process water in every loop in the circuit and thus to be able to minimize the fresh water addition, the process water has to be cleaned to a required degree in the individual process water treatment units. For this purpose, the process water treatment units usually include a stock recovery unit and/or a material removal unit in which fibers contained in the process water are mechanically separated from the process water to be led back in full or in part to the recovered paper treatment apparatus. These stock recovery units or material removal units are usually designed as screening apparatus and/or as dissolved air flotation apparatus.

A system for the manufacture of paper from recovered paper is known from DE 40 42 224 A1 which includes a recovered paper treatment apparatus comprising a loop as well as a paper-making machine. The recovered paper treatment apparatus includes a pulper into which recovered paper is introduced and is mixed with process water to pulp the recovered paper, a sorting stage which is provided downstream of the pulper and in which impurities are separated from the suspended fibrous material manufactured in the pulper, a thickening unit to remove the process water as much as possible from the suspended fibrous material, as well as a process water treatment unit to purify the process water. The process water treatment unit in turn substantially comprises a pre-purification apparatus, an anaerobic clarifying stage, for example including a UASB reactor, as well as an aerobic clarifying stage. The process water purified in the process water treatment unit can either be disposed of as waste water or, in accordance with another embodiment, can be conducted back into the pulper as pulping water in part and into the paper-making machine in part, with in this case a part flow of white water from the paper-making machine being added to the process water conducted through the process water treatment unit of the recovered paper treatment apparatus.

The process water circuits of the paper-making machine and of the process water treatment unit are thus not completely decoupled from one another in this system so that the quality of the process water in the paper-making machine and the quality of the process water in the recovered paper treatment apparatus cannot be controlled efficiently and independently of one another. A further disadvantage of the last-named embodiment is that a high water hardness is adopted in the process water due to the partial circuit guidance and this water hardness can disturb the operation of the anaerobic UASB reactor. Microorganism pellets are namely used in anaerobic reactors for whose function it is important that they have a defined specific weight to be able to rise to the top in the reactor to separate the biogas formed at a gas separator during the degradation of the organic compounds from the process water due to the biogas which is formed in this process and which adheres to the microorganism pellets. After separation of the biogas, the specific weight may in particular not become so large that the microorganism pellets drop to the bottom of the reactor since they can otherwise no longer take part in the purification process. Due to their structure and size, microorganism pellets, however, act as crystallization nuclei for lime deposits so that lime is deposited onto the microorganism pellets at a specific water hardness and at corresponding pH values, with these deposits resulting in an incalculable shift in the specific weight of the pellets so that they can no longer take over their function. The metabolic activity of the anaerobic microorganisms also affects a shift in the lime/carbonic acid balance due to the generation of hydrogen carbonate ($HCO_3-$) among other things, which further promotes a lime precipitation onto the microorganism pellets. In order to ensure the function of the microorganism pellets despite the lime precipitation thereon, the recirculation amounts in the anaerobic reactor would have to be increased to keep the pellets in suspension in the reactor despite their larger specific weight. However, the recirculation amount is subject to limits by the hydraulic capacity of the separators, on the one hand, and by the necessity of keeping the flow in the reactor laminar, on the other hand. Higher recirculation amounts moreover cause the escape of carbon dioxide and thereby a further shift of the lime/carbonic acid balance in the direction of lime precipitation due to the arising of pressure gradients at the suction and pressure side of the pump in the recirculation line.

To combat these disadvantages, a process for treating process water conducted in a circuit, in particular for treating process water in the manufacture of paper, including at least one process water treatment step was proposed in WO 2007/076943, in which process at least some of the process water continuously supplied to the process water treatment step is subjected to a cleaning step in an anaerobic reactor charged with anaerobic microorganisms as well as to a deliming step, wherein the process water is subjected to a dissolved air flotation step in the deliming step. On the basis of the purification of the process water in an anaerobic reactor, impurities contained in the process water can be efficiently removed so that the process water can be conducted at least almost completely in the circuit due to the purity of the process water thereby achieved without the impurities being augmented by the circuit conducting. In addition, the water hardness of the process water conducted in the circuit can be controlled on the basis of the softening or deliming in the dissolved air flotation step such that no lime deposits disturbing the microorganism pellets contained in the anaerobic reactor arise in the anaerobic reactor, whereby the efficiency of the anaerobic reactor is optimized. To achieve sufficient deliming, this process, however, requires the use of large quantities of expensive precipitants and flocculants. However, even on the use of large quantities of precipitants and flocculants, the degree of deliming achieved per reactor volume and per time unit requires improvement in this process.

It is therefore the object of the present invention to provide a method for treating process water, wherein the process water is efficiently purified, wherein in particular the water hardness and the quality of the process water can be directly controlled and which is in particular also suitable for treating process water having a high water hardness, such as process water in a system for manufacturing paper from recovered paper, which method is characterized by a high degree of purification per reactor volume and per time unit and which in particular requires comparatively small amounts of precipitant and/or flocculant. The treated water should in particular be purified such that a disturbance of the operation of an aerobic reactor due to lime precipitation phenomena can be reliably avoided.

In accordance with the invention, this object is satisfied by a method in accordance with claim 1 and in particular by a method for purifying process water, in particular for continuously purifying process water in the paper-making industry, comprising at least one process water treatment step which includes the following steps:

a) an anaerobic cleaning step in which process water to be purified is brought into contact with anaerobic microorganisms in an anaerobic reactor to degrade impurities contained in the waste water;

b) a first separation step in which gases contained in the process water are selectively separated from the process water obtained in step a); and c) a second separation step in which solids contained in the process water are separated from the process water obtained in step b).

The process water removed in the anaerobic purification step is a three-phase mixture which contains water comprising ions contained dissolved therein, such as carbonate ions and hydrogen carbonate ions, solids and gases formed in the anaerobic reactor, in particular $CO_2$ formed by the microorganisms. In the first separation step b), the gases are first selectively separated from this three-phase mixture, whereas the solids are only separated from the process water in the second separation step c). Selective separation of gases from the process water (i.e. from the aforesaid three-phase mixture) means in the sense of the present invention that more of the gas(es) contained in the process water is separated percentage-wise in the first separation step b) than of the solids contained in the process water. Accordingly, selective separation of gases from the process water in the sense of the present invention in particular means that at least 40%, preferably at least 60%, in particular preferably at least 80%, particularly preferably at least 90% and very particularly preferably at least 95% of the gas(es) contained in the process water are separated in the first separation step b), whereas a maximum of 30%, preferably a maximum of 20%, in particular preferably a maximum of 10%, particularly preferably a maximum of 5% and very particularly preferably a maximum of 1% of the solids contained (suspended) in the process water are separated in this first separation step b). It is achieved by the separation of the gas(es) that a substantial portion of the ions contained in the process water forms solids so that the process water has a higher solid portion after the first separation step b), with respect to the total weight of the process water (together with the foreign matter contained therein) than before the first separation step b). This is due to the fact that the balance between dissolved ions and solids is displaced in favor of the solids due to the removal of gas from the process water during the first separation step b), namely that, for example due to the removal of the gases, in particular of the carbon dioxide contained in the process water, the balance of lime to carbonic acid is displaced in favor of the solids, that is lime. The solids which thus arise are removed from the process water together with the solids which may already be contained in the process water before the first separation step b) in the second separation step c).

A better clarification of the process water and in particular a better softening of the process water per volume of the apparatus used for the first and second separation steps and per time unit is achieved overall by this process management. Due to the purity thereby achieved, the process water can be conducted completely or at least almost completely in the circuit without the impurities being augmented by the circuit guidance, which allows a minimization of the fresh water requirement of the system. In addition, in the method in accordance with the invention, the water hardness in the process water conducted in the circuit can be controlled so that no appreciable quantities of lime deposits disturbing the microorganism pellets contained in the anaerobic reactor arise in the anaerobic reactor, whereby the efficiency of the anaerobic reactor is optimized. Overall, the system in accordance with the invention thus makes possible an at least almost complete circuit guidance of the process water and the efficient control of the quality of the process water. A further advantage of the method in accordance with the invention with respect to that method known from WO 2007/076943 is that in the method in accordance with the invention less precipitant and flocculant is required for a degree of clarification of the process water to be achieved than in the method known from WO 2007/076943. The operating costs are thereby significantly reduced, and indeed by at least 30%. In addition, due to the lower use of precipitant and flocculant, the operating safety of the method is increased because the following steps are not charged with the precipitant and flocculant.

In accordance with a preferred embodiment of the present invention, the first separation step b) is carried out in a strip tank in which the process water is conducted with air through the strip tank in co-flow or in counter flow. In this embodiment, the process water can, for example, be conducted with air in co-flow from bottom to top through the strip tank and the gas can be removed in the upper region of the strip tank. Alternatively to this, it is also possible to conduct the process water from top to bottom through the strip container, to conduct air in counter flow from bottom to top through the strip tank and to remove the gas in the upper region of the strip tank.

To achieve an efficient removal of gas(es) from the process water in the first separation step b), it has proved advantageous to apply an underpressure in the strip container during the conducting through of the process water and the conducting through of the air. This underpressure with respect to the atmospheric pressure preferably amounts to 10 to 50 mbar, particularly preferably to 15 to 25 mbar and very particularly preferably to approximately 20 mbar. Alternatively to this, it is, however, also possible, if also less preferred, to operate the first separation step b) at atmospheric pressure or, albeit even less preferred, at a slight overpressure.

In a further development of the idea of the invention, it is proposed for the purpose of achieving an efficient removal of gas(es) and of avoiding the separation of solids from the process water to mix the process water and the air with one another in the strip tank by means of an agitator device in the first separation step b). In this respect, any mixing device familiar to the skilled person can be used as an agitator device, in particular a dynamic mixer such as a propeller stirrer, or a static mixer. The expulsion of gas(es) is promoted due to the energy introduced into the process water (i.e. the three-phase mixture) on the basis of the agitator device. In addition, a homogenous suspension is achieved by the intensive mixing of the process water containing solids so that it is reliably prevented that the solids contained suspended in the process water separate from the water, for example by deposition, in the strip tank.

The aforesaid embodiment can, for example, be performed such that the process water is conducted from bottom to top through the strip tank in the first separation step b), air is supplied to the strip tank in its lower region such that the air bubbles through the process water in the form of air bubbles and the process water and the air bubbles are mixed with one another by means of an agitator device in the strip tank.

It has in particular proved advantageous in the aforesaid embodiment to supply the air to the strip tank such that the air bubbles bubbling through the process water have an average size of 150 to 600 μm and preferably of 200 to 400 mm.

As already presented, it is achieved by the removal or the expulsion of gas from the process water that solids are formed in the process water from the ions contained dissolved therein during the first separation step b), said solids remaining suspended in the process water. To facilitate the solid formation during process step b), a precipitant and/or at least one flocculant can be admixed to the process water during the first separation step b). In this embodiment, all precipitants and/or flocculants familiar to the skilled person can be used. Good results are in particular achieved when the precipitant is a base such as sodium hydroxide or an aqueous sodium hydroxide solution, that is soda lye. Alternatively to this or additionally to this, an aluminum salt, preferably aluminum sulfate, am iron salt, preferably iron sulfate, polyaluminum chloride or sodium aluminate can also be used as a precipitant. An example for a suitable flocculant is polyacrylamide.

The pH of the process water in the first separation step b) is set to 6.5 to 10, preferably to 6.8 to 9, and particularly preferably to 7.2 to 8.2, to facilitate the solid formation. A pH in one of the aforesaid ranges in particular promotes the formation of lime from the hydrogen carbonate ions and carbonate ions contained in the process water. However, the setting of the pH in one of the aforesaid ranges is not absolutely necessary for carrying out the method in accordance with the invention.

In principle, the separation of the solids can take place in the second separation step c) by any suitable separation method for separating solids and liquids, with a plurality of different separation methods also being able to be combined with one another. Good results are in particular achieved in this respect when the solids are separated from the process water in the second separation step c) by means of filtration and/or flotation, with the flotation being able to be carried out, for example, as a (coarse-bubble) dispersive flotation or as a (fine-bubble) dissolved air flotation In the dissolved air flotation used in the second separation step c), at least one precipitant and/or at least one flocculant is/are preferably first admixed to the process water to be treated, provided this has not already been done in the preceding first separation step b), with the pH of the process water being set to a value of 6.5 to 10, preferably of 6.8 to 9, and particularly preferably of 7.2 to 8.2, by the addition of the precipitant. Subsequently, pressure gas, preferably compressed air, is added to the mixture produced in this manner and this mixture is pressurized before the pressurized mixture is expanded or exposed to a reduced pressure in a dissolved air flotation apparatus, whereby the previously added pressure gas bubbles out of the water at least very largely in the form of gas bubbles and flows upward. Alternatively to this, a water admixed with pressurized gas can also be added to the process water and is expanded after the addition to the process water so that the pressurized bubbles out of the water gas at least very largely in the form of gas bubbles and flows upwardly. In this respect, the gas bubbles take along the solid flakes contained in the water so that they are separated from the water.

To achieve an efficient solid separation, it is proposed in a further development of the idea of the invention to design the dissolved water flotation apparatus such that the pressure difference between the pressurization and the expansion amounts to at least 2 bar, preferably at least 3 bar, particularly preferably at least 4 bar, and very particularly preferably at least 5 bar. The greater the aforesaid pressure difference, the smaller the gas bubbles arising during the expansion so that an increased lime separation is achieved due to the larger surface to volume ratio of the gas bubbles.

In accordance with a further preferred embodiment, a part flow is removed from the process water after the second separation step c), this part flow is mixed with the process water after the anaerobic purification step a) and the mixture thus obtained is subjected to the first separation step b).

Alternatively to this or additionally to this, it is also possible to mix a portion of the solid arising in the second separation step c) with the process water after the anaerobic purification step a) and to subject the mixture thus obtained to the first separation step b). In this respect, the portion of the solids conducted back serves in the method step b) as crystallization nuclei for the solids to be formed from the ions contained in the process water.

The method in accordance with the invention can generally be used for purifying all the process water conducted in the circuit in a system. In particular in the manufacture of paper, the process water is charged with significant amounts of impurities so that the method in accordance with the invention is in particular suitable for the purification of process water arising in the manufacture of paper, independently of whether it is process water of a system for the manufacture of paper from fresh fibers or process water of a system for the manufacture of paper from recovered paper.

In the aforesaid embodiment, the process water supplied to the process water treatment step comes from a stock preparation apparatus and/or from a paper-making machine.

The process water continuously supplied to the process water treatment step in this embodiment preferably comes from at least one stage of a recovered paper treatment apparatus and/or from a paper-making machine.

A further subject of present invention is a system for purifying process water, in particular for continuously purifying process water in the paper-making industry, which has at least one process water treatment unit, with the process water treatment unit comprising:
  i) a reactor for the anaerobic purification of process water with at least one feed line for supplying process water to be purified into the reactor as well as with at least one outflow line for leading purified process water out of the reactor;
  ii) a first separation apparatus arranged downstream of the anaerobic reactor for selectively separating gases from the process water, with the first separating apparatus having a feed line for process water connected to the outflow line of the anaerobic reactor, a gas feed line, a gas outflow line and an agitator device; and
  iii) a second separation apparatus arranged downstream of the first separation apparatus and connected to the first separation apparatus via a line for separating solids from the process water.

Any mixing device, in particular a dynamic mixer or a static mixer, can in principle be used as an agitator device.

The first separation apparatus preferably includes a strip tank in whose lower region the feed line for process water and the gas feed line open and in whose open region the gas outflow line is arranged.

In accordance with a further preferred embodiment, the first separation apparatus has at least one feed line for a precipitant and/or for a flocculant.

It is proposed in a further development of the idea of the invention that the second separation apparatus includes a filtration apparatus and/or a flotation apparatus. In this respect, the flotation apparatus can be designed as a dispersive flotation apparatus or as a dissolved air flotation apparatus.

A part flow return line for process water is preferably provided at the second separation apparatus and opens into the feed line for process water leading to the first separation apparatus.

Alternatively to this or additionally to this, a part flow return line for solids can be provided at the second separation apparatus and opens into the feed line for process water leading to the first separation apparatus. The solids led back via this part flow return line act as crystallization nuclei in the first separation apparatus.

The system for purifying process water in accordance with the present invention can generally be integrated in any system in which process water is conducted in a circuit. In particular in the manufacture of paper, the process water is charged with significant amounts of impurities so that the system in accordance with the invention is in particular suitable for purifying process water arising in the manufacture of paper, independently of whether it is process water of a system for the manufacture of paper from fresh fibers or process water of a system for the manufacture of paper from recovered paper.

In this case, the system in accordance with the invention includes, in addition to at least one process water treatment unit, at least one stock preparation apparatus and/or at least one paper-making machine, with the at least one stock preparation apparatus and/or the at least one paper-making machine being associated with at least one of the process water treatment units.

In particular when the system in accordance with the invention is a system for the manufacture of paper from recovered paper, it preferably has a recovered paper treatment apparatus as a stock preparation apparatus for the manufacture of fibrous material from the recovered paper and/or a paper-making machine for the manufacture of paper from the fibrous material, with the recovered paper treatment apparatus having one or more stages and at least one of these stages and/or the paper-making machine including their own process water treatment unit. In particular when the paper-making machine and every stage or every loop of the recovered paper treatment apparatus include a process water treatment unit, the process water quality, that is the amount of impurities contained in the process water, can be controlled separately for every loop. An optimum quality water management is thereby made possible in the manufacture of paper from recovered paper.

To achieve an efficient use of the recovered paper used in the system as well as of the fibers contained therein, it is proposed in a further development of the idea of the invention furthermore to provide a stock recovery unit and/or a material removal unit in the at least one process treatment unit. Good results are in particular achieved when the stock recovery unit or the material removal unit is made as a combination of stock recovery apparatus (e.g. an apparatus with a screen barrier) and a microflotation apparatus (or dissolved air flotation apparatus) in series as a cascade. In the first stage, which is preferably made as a spray filtration, the useful fibers are recovered, whereas in the second step, namely the material removal, the excepts are removed from the process water.

In accordance with a further preferred embodiment, the at least one process water treatment unit furthermore includes a separate filtration unit connected after the second separation apparatus to separate fine solid particles contained in the process water. This filtration unit is preferably arranged downstream of the anaerobic reactor and downstream of the two separation apparatus.

All types of anaerobic reactors known to the skilled person can be used as the reactor charged with anaerobic microorganisms, for example contact sludge reactors, UASB reactors, EGSB reactors, fixed bed reactors and fluidized bed reactors, with good results in particular being achieved with UASB reactors and ESGB reactors. A pre-acidification reactor can be connected before the anaerobic reactor and the process water is subjected to acidogenesis and/or hydrolysis in it before the supply into the anaerobic reactor. Whereas polymers such as polysaccharides, polypeptides and fasts are degraded to their monomers such as sugar, amino acids and fatty acids during the enzymatic hydrolysis by exoenzymes originating from microorganisms, these monomers are converted in the acidogenesis into organic acids, alcohols, aldehydes, hydrogen and carbon dioxide by acidogenic microorganisms.

Preferably, the stock preparation apparatus of the system includes one or more stages, with good results in particular being achieved with systems including 1 to 3 stock preparation apparatus, with the mutually individual stages preferably being decoupled from one another by a deckering stage. The stock preparation apparatus particularly preferably includes two mutually decoupled stages. In the case of a system for the manufacture of paper from recovered paper, in which the stock preparation apparatus is designed as a recovered paper treatment apparatus, the stock preparation stage(s) is/are made as recovered paper treatment stages.

Independently of the number of the stages of the stock preparation apparatus, provision is made in accordance with a further preferred embodiment of the present invention that, in a system for the manufacture of paper, both at least one of the stages of the stock preparation apparatus and the paper-making machine each include their own process water treatment unit, with the individual process water treatment units each having an anaerobic reactor, a first separation apparatus and a second separation apparatus.

It is proposed in a further development of the idea of the invention that all the stages of the stock preparation apparatus and the paper-making machine each include their own process water treatment unit, with the individual process water treatment units each having an anaerobic reactor, a first separation unit and a second separation apparatus. The process water quality, that is the quantity of the impurities contained in the process water, can be controlled separately for each loop in this manner. An optimum quality water management is thereby made possible in the manufacture of paper.

A further subject of the present invention is a method for purifying process water, in particular for continuously purifying process water in the paper-making industry, which is carried out in the previously described system in accordance with the invention.

The present invention will be described in the following purely by way of example with reference to advantageous embodiments and to the enclosed drawings.

Figure 2:
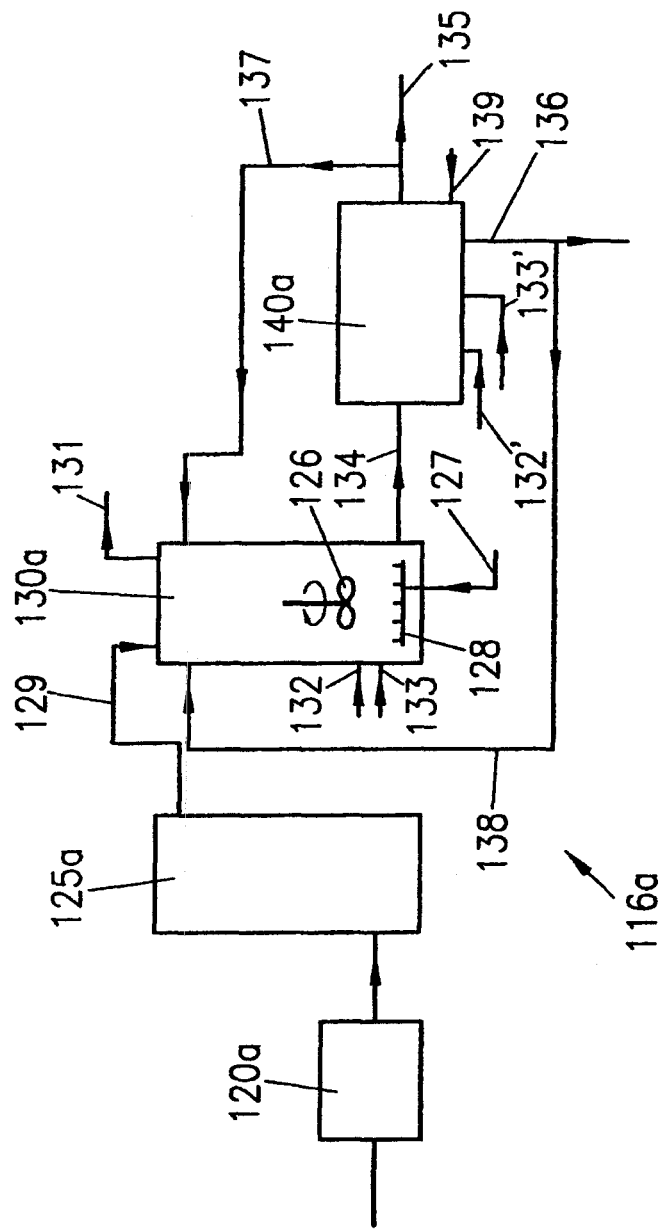
Figure 3:
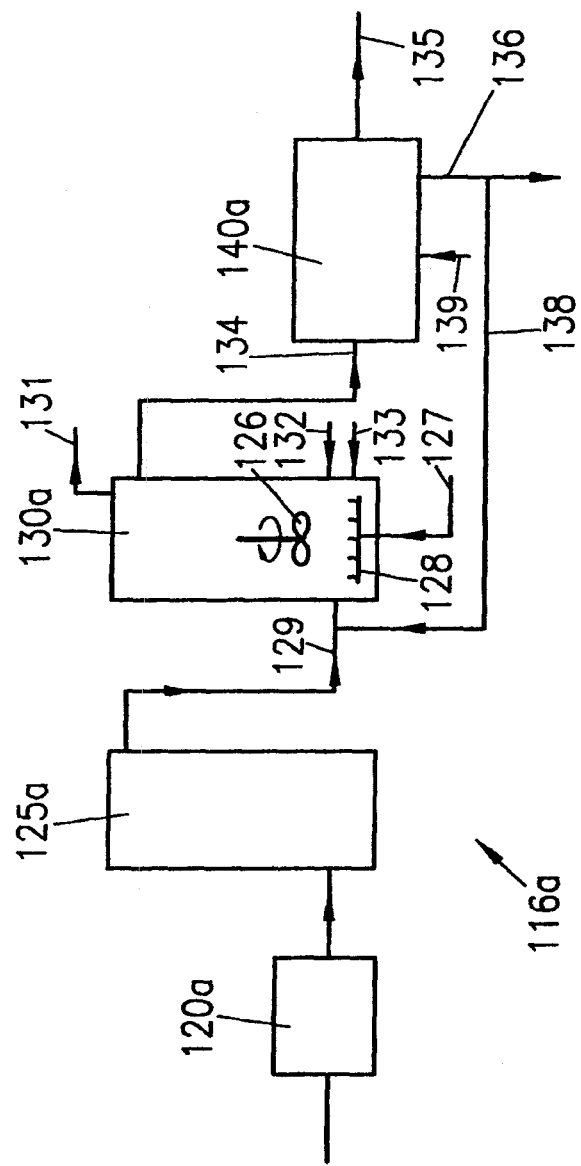

There are shown:

FIG. 1 a schematic view of a system for the manufacture of paper from recovered paper in accordance with a first embodiment of the present invention;

FIG. 2 a schematic view of the process water treatment unit of the system shown in FIG. 1; and FIG. 3 a schematic view of a process water treatment unit in accordance with another embodiment of the present invention.

The system shown in FIG. 1 includes a recovered paper treatment apparatus 100 as well as a paper-making machine 200 arranged downstream thereof and connected to the recovered paper treatment apparatus 100. In this connection, the recovered paper treatment apparatus 100 includes two stages or loops 101a and 101b substantially decoupled from one another and indicated by the chain dotted boxes in FIG. 1.

The first stage 101a of the paper treatment apparatus 100 includes a raw material inlet 102, a pulper or pulping engine 105, a sorting device 110a as well as a deckering unit 115a which are arranged sequentially and are each connected to one another. In the sense of the present invention, a pulper or pulping engine 105 is not only understood as a device, as shown schematically in FIG. 1, comprising an apparatus part, but rather in particular also as an apparatus combination which includes a plurality of individual apparatus parts and which contains all the components or units required for the pulping. The same also applies to the sorting device 110a, to the deckering unit 115a and to all the other components shown in FIG. 1.

The pulping engine 105 and the sorting device 110a are each connected to a reject treatment unit 118a via a line.

The first stage 101a of the recovered paper treatment apparatus 100 moreover includes a process water treatment unit 116a to which there is supplied via corresponding lines from the reject treatment unit 118a, from the sorting apparatus 110a as well as from the deckering unit 115a the process water arising in these system parts. In this connection, the sorting apparatus 110a can also include a series of sorting devices (not shown). The process water treatment unit 116a comprises a stock recovery unit 120a, an anaerobic reactor 125a charged with anaerobic microorganisms, a first separation apparatus 130a as well as a second separation apparatus 140a which are arranged sequentially and are connected to one another. A return line 145a leads back from the second separation apparatus 140a to the pulping engine 105. In addition to the stock recovery unit 120a or instead of the stock recovery unit 120a, a material removal unit (not shown) can be provided in the recovered paper treatment apparatus 100.

Unlike the first stage 101a, the second stage 101b of the recovered paper treatment apparatus 100 includes a sorting apparatus 110b connected to the deckering unit 115a, an oxidation unit or reduction unit 112 as well as a deckering unit 115b which are arranged sequentially and connected to one another. In addition, the second stage 101b has a process water treatment unit 116b which, is made analog to the process water treatment unit 116a of the first stage 101a, with the second separation apparatus 140b of the second stage 101b of the recovered paper treatment apparatus 100 being connected via a return line 145b to the sorting apparatus 110b and via a part flow line 170a to the return line 145a of the first stage 101a of the recovered paper treatment apparatus 100 coming from the second separation apparatus 140a. While the sorting apparatus 110b and the oxidation unit or reduction unit 112 are connected via corresponding lines to a reject treatment unit 118b, the deckering unit 115b is connected directly to the stock recovery unit 120b of the process water treatment unit 116b. In addition, a line leads from the oxidation unit or reduction unit 112 to the stock recovery unit 120b.

The paper-making machine 200 includes a centrifugal sorter 202, a fine sorting apparatus 204, a paper-making machine shaping part 206, a paper-making machine pressing part 208 as well as a drying part 210 which are arranged sequentially and are connected to one another. The centrifugal sorter 202 and the fine sorting apparatus 204 are connected to a reject treatment unit 212 and the paper-making machine shaping part 206 and the paper-making machine pressing part 208 are connected to a fiber recovery unit 214. In addition, the reject treatment unit 212 and the fiber recovery unit 214 are connected via corresponding lines to a process water treatment unit 216 which comprises a material removal unit 220, an anaerobic reactor 225 charged with anaerobic microorganisms, a first separation apparatus 230 and a second separation apparatus 240. In addition, a return line 270 leads from the filtration unit 240 of the paper-making machine 200 into the line 170 of the second stage 101b of the recovered paper treatment apparatus 100. The fiber recovery unit 214 and the material removal unit 220 can also be combined in an apparatus part made, for example, as a microflotation.

Furthermore, a fresh water line 280, via which fresh water can be supplied to the paper-making machine, is provided in the region of the paper-making machine 200. In this respect, the fresh water supply line 280 can open in the paper-making machine 200 at various points, for example in the feed line to the centrifugal sorter 202 and/or in the paper-making machine shaping part 206 and/or the paper-making machine pressing part 208 so that the exact position of the fresh water feed line 280 is not shown in FIG. 1. In addition, a waste water line 300 is provided in the system via which waste water can be drained out of the system. The waste water line 300 can also be arranged at different positions of the system, for example at the line 170 so that the exact position of the waste water line 300 is also not shown in FIG. 1. The waste water line 300 leads into a mechanical material removal unit 305 after which a cooling unit 310 as well as a biological waste water purifying unit 315 is connected. A line leads from the biological waste water purifying unit 315, which can include a lime elimination unit and a filtration unit, into public waters 400, for example into a river; however, a part flow hereof can also be led back into the paper-making machine or into the stock treatment if required.

In the operation of the system, recovered paper is continuously introduced via the raw material inlet 102 into the pulping engine 105 of the first stage 101a of the recovered paper treatment apparatus 100 in which the recovered paper is mixed with process water supplied via the return line 145a and is comminuted for the recovery of the fibers. Whereas the fibers recovered in the pulping engine 105 are continuously moved into the sorting apparatus 110a, the process water which arises in the pulping engine 105 and which can include residues of fibers is first conducted into the reject treatment unit 118a and from there, after separation of the rejects, into the stock recovery unit 120a of the process water treatment unit 116a of the recovered paper treatment apparatus 100. In the sorting apparatus 110a, light or heavy non-belonging parts which are larger than fibers, such as coarse impurities in the form of plastic foils and plastic pieces are sorted out of the fiber suspension, for example by screen barriers and typically in multi-stages. In addition, a flotation can also be carried out in the sorting apparatus 110a for the purpose of the elimination of pigments, ink and dye particles (de-inking). In addition, excepts and ash can be separated in the material wash. The fiber suspension is thickened by the removal of process water in the deckering unit 115a which is arranged downstream of the sorting apparatus 110a and which is preferably made as a deckering filter and/or as a screw press to move as a thickened fiber suspension from the deckering unit 115a into the sorting apparatus 110b of the second stage 101b of the recovered paper treatment apparatus 100. A part flow of the process water arising in the sorting apparatus 110a is conducted into the reject treatment unit 118a, whereas the other part flow of the process water rising in the sorting apparatus 110a, together with the process water arising in the deckering unit 115a of the first stage 101a, is conducted directly via corresponding lines into the stock recovery unit 120a of the process water treatment unit 116a of the first stage 101a of the recovered paper treatment apparatus 100 in which fibrous materials from the process water contained therein are separated which are again supplied to the treatment process. The stock recovery unit 120a is preferably designed as a dissolved water flotation apparatus.

Alternatively to this, a part flow of the process water removed from the deckering unit 115a or the total process water removed from the deckering unit 115a can be led back directly into the pulping engine 105, i.e. while bypassing the process water treatment unit 116a. In particular in the manufacture of paper in which the process water has a low solid concentration, such as in the manufacture of graphic paper, the stock recovery unit 120a, 120b or the material removal unit 220 can be omitted.

In the system shown in FIG. 1, the process water arising in the reject treatment unit 118a is led into the stock recovery unit 120a. Alternatively to this, however, it is also possible to drain off the process water arising in the reject treatment unit 118a as waste water from the recovered paper treatment apparatus 101a and, for example, to conduct it via the waste water line 300 into the mechanical material removal unit 305 and subsequently through the cooling unit 310 and the biological waste water purification unit 315.

Process water liberated from fibrous materials is led continuously from the stock recovery unit 120a into the reactor 125a charged with anaerobic microorganisms in which dissolved or colloidally dissolved organic materials are degraded by the effect of the anaerobic microorganisms in the process water. In this respect, a cooling stage (not shown) and a pre-acidification reactor (not shown), in which the process water is subjected to acidogenesis and/or hydrolysis, can be connected before the anaerobic reactor 125a for the purpose of setting the process water to an ideal temperature range. The process water thus liberated from the chemical and biological impurities is conducted from the anaerobic reactor 125a into the first separation apparatus 130a which is disposed downstream and which is preferably designed as a strip container to which the process water is supplied, for example from below, from the anaerobic reactor 125a, said process water being brought into contact in the strip tank with air supplied from above in counter flow to the strip tank, with the strip tank having an agitator device for intensive mixing of the process water and the air. In the first separation apparatus 130a, the gases contained in the process water are expelled from the process water and are thus separated from the process water and the ions contained in the process water, for example the carbonate ions and hydrogen carbonate ions, are largely precipitated as solids, for example as calcium carbonate. The solid precipitation in this respect takes place in the first separation apparatus 130a by the displacement of the balance between ions and solids, such as the lime/carbonic acid balance, as a result of the removal of the gases from the process water, with this balance displacement being able to be facilitated by the metering in of suitable chemicals, in particular of a precipitant, for example of a base, by which the pH of the process water is set to a neutral or alkaline value which preferably amounts to between 6.5 and 10, particularly preferably between 6.8 and 9, and very particularly preferably between 7.2 and 8.2. In addition, for this purpose, flocculants can also be added to the process water to further facilitate the precipitation of solids and the formation of solid flakes having a size suitable for effective separation. Due to the intensive mixing of the process water and of the solids by the agitator device in the first separation apparatus 130a, a homogeneous suspension is obtained in the strip tank so that not substantial separation of solids from the process water takes place in the strip tank, for example by deposition of the solids or by flotation. The process water containing the solids in suspended form is supplied from the first separation apparatus 130a to the second separation apparatus 140a which is formed, for example, as a dissolved air flotation unit or as a filtration unit to separate the solids from the process water. In addition, a desalination unit (not shown) can be connected after the second separation apparatus 140a.

The process water purified in the process treatment unit 116a of the first stage 101a of the recovered paper treatment apparatus 100 is guided back via the return line 145a into the pulper or pulping engine 105.

The thickened fibrous material suspension drained off from the deckering unit 115a of the first stage 101a of the recovered paper treatment apparatus 100 moves into the sorting stage 110b and from there into an oxidation unit or reduction unit 112 before the fiber suspension is thickened in the deckering unit 115a of the second stage 101b in order to remove as much of the process water as possible from the fiber suspension. Analogously to the first stage 101a of the recovered paper treatment apparatus 100, the process water arising in the sorting apparatus 110b and a part flow of the waste water arising in the oxidation unit or reduction unit 112 are conducted into the reject treatment unit 118b and the process water arising there is led into the stock recovery unit 120b. The other part flow of the process water arising in the oxidation unit or reduction unit 112 as well as the process water arising in the deckering unit 115a are led directly into the stock recovery unit 120b of the process water treatment unit 116b of the second stage 101b of the recovered paper treatment apparatus 100 and are purified and delimed in the process water treatment unit 116b. The process water treated in this manner moves in the larger part from the second separation apparatus 140b via the line 170 and the return line 145b back into the sorting apparatus 110b, whereas any possible excess of process water is conducted back via the part flow line 170a to the first stage 101a of the recovered paper treatment apparatus 100 and is led into the return line 145a leading into the pulping engine 105.

In the paper-making machine 200, the thickened pulp suspension supplied from the deckering unit 115b is processed to paper by means of the centrifugal sorter 202, in which portions with a higher or low specific weight than water are separated, by mans of the fine sorting apparatus 204, by means of the paper-making machine shaping part 206, by means of the paper-making machine pressing part 208 and by means of the drying part 210. Whereas the process water arising in the system parts 202 and 204 is conducted into the reject treatment unit 212, the process water arising in the system parts 206 and 208 is led into the fiber recovery unit 214. Whereas the rejects are deckered in the reject treatment unit 212, the process water originating from the paper-making machine shaping part 206 and from the paper-making machine pressing part 208 undergoes preremoval of material in the fiber recovery unit 214 and fibers are separated from it. Process water arising in the reject treatment unit 212 and in the fiber recovery unit 214 is led continuously into the process water treatment unit 216 of the paper-making machine 200 and there sequentially flows through the material removal unit 220, the anaerobic reactor 225, the first separation apparatus 230 and the second separation apparatus 240 which work like the previously described corresponding system parts of the process water treatment units 116a, 116b of the recovered paper treatment apparatus 100. Alternatively to this, the process water arising in the reject treatment unit 212 can be drained out of the system as waste water and only the process water arising in the fiber recovery unit 214 can be led continuously through the process water treatment unit 216 of the paper-making machine 200. The purified process water removed from the second separation apparatus 240 is largely led back into the centrifugal sorter 202 of the paper-making machine 200 via the return line 270 and the part flow line 270b, whereas any possible excess of process water is led via the part flow line 270a into the line 170 coming from the second separation apparatus 140b of the second stage 101b of the recovered paper treatment apparatus 100.

A completely closed process water circuit would admittedly generally be possible, but would result in enrichments of disturbing materials in the long term which would ultimately impair the efficiency of the system. A relatively small portion of fresh water, relative to the amount of process water conducted in the circuit, is therefore supplied to the process, preferably to the paper-making machine 200, via the fresh water feed line 280. A corresponding amount of process water is removed from the process via the waste water line 300 and is further clarified via the material removal unit 305, the cooling unit 310 and the biological waste water purification unit 315, which can also include a lime elimination unit and/or a filtration unit, before this flow is drained into public waters 400 as waste water. In addition, the waste water optionally drained, as mentioned above, from the reject treatment units 118a, 118b, 212 can also be removed from the process via the waste water line 300 and can be clarified via the material removal unit 305, the cooling unit 310 and the biological waste water unit 315.

In the embodiment shown in FIG. 1, it is a question of a system for the manufacture of paper from recovered paper. In this respect, the pulping engines 105, sorting devices 110a, 110b, deckering units 115a, 115b, oxidation unit or reduction unit 112, centrifugal sorter 202, fine sorting apparatus 204, paper-making machine shaping part 206 and paper-making machine pressing part 208 are only shown schematically and do not reproduce the paper-making system down to the last detail. For example, one of the two sorting apparatus 110a, 110b or both of the sorting apparatus 110a, 110b can also be made in multiple stages and consequently include a sequence of sorting devices.

The system in accordance with the invention can equally be a system for the manufacture of paper from fresh fibers or any desired other system in which at least one process water treatment unit is provided, with at least one of the process water treatment units having an anaerobic reactor charged with anaerobic microorganisms as well as having a second separation apparatus. In the last-named case, the pulping engines 105, sorting devices 110a, 110b, deckering units 115a, 115b, oxidation unit or reduction unit 112, centrifugal sorter 202, fine sorting apparatus 204, paper-making machine shaping part 206 and paper-making machine pressing part 208 shown in FIG. 1 have been replaced with corresponding other apparatus or apparatus parts.

In FIG. 1, the system includes a two-stage stock preparation. It is naturally also possible to provide two or more parallel stock treatments, in particular for the manufacture of multilayer paper.

In FIG. 2, the process water treatment unit 116a of the first stage 101a of the recovered paper treatment apparatus 100 of the system shown in FIG. 1 is shown in greater detail. In this respect, the first separation apparatus 130a is designed as a strip tank which has a propeller agitator 126, a gas distributor 128 connected to a gas feed line 127, a feed line 129 for the process water coming from the anaerobic reactor 125a into the strip tank, a gas outflow line 131, a feed line 132 for precipitant and a feed line 133 for flocculant. A process water line 134 leads from the first separation apparatus 130a into the second separation apparatus 140a which is designed as a dissolved air flotation reactor. The second separation apparatus 140a also has a feed line 132' for precipitant and a feed line 133' for flocculant. The second separation apparatus 140a furthermore includes a feed lone 139 for water containing compressed air. In addition, the second separation apparatus 140a has a process water outflow line 135 and a solid outflow line 136, with a part flow return line 137 for process water leading from the process water outflow line 135 into the upper region of the first separation apparatus 130a and a part flow return line 138 for solids leading from the solid outflow line 136 into the upper region of the first separation apparatus 130a.

In the operation of the system, fibrous materials contained in the process water are separated from the process water in the stock recovery unit 120a of the process water treatment unit 116a of the first stage 101a of the recovered paper treatment apparatus 100. The process water moves from the stock recovery unit 120a into the anaerobic reactor 125a in which organic matter dissolved or colloidally dissolved in the process water is degraded by the effect of the anaerobic microorganisms. The process water is then conducted from the anaerobic reactor 125a via the process water feed line 129 into the upper region of the first separation apparatus 130a which is designed as a strip tank and in which the process water is conducted from top to bottom. Air which flows through the first separation apparatus 130a from bottom to top, that is in counter flow to the process water, is introduced into the lower region of the first separation apparatus 130a via a gas feed line 127 and a gas distributor 128. In addition, precipitant (e.g. soda lye) and flocculant (e.g. polyacrylamide) are continuously supplied to the first separation apparatus via the feed lines 132, 133, with the process water, the precipitant, the flocculant and the air being mixed with one another by the propeller agitator 126 in the first separation apparatus. Gas which is contained in the process water and which is removed from the first separation apparatus 130a together with the air supplied to the first separation apparatus 130a via the gas outflow line 131 is expelled from the process water by this process management. The balance between ions and solids in the process water, such as the lime/carbonic acid balance, is displaced by the gas expelled from the process water in favor of the solids so that solids precipitate in the process water, with the solids remaining homogeneously suspended in the process water due to the mixing by the propeller agitator and not being deposited in the first separation apparatus 130a (top or bottom). The solids led back from the second separation apparatus 140a via the part flow return line 138 in this respect act as crystallization nuclei in the first separation apparatus 130a which facilitate the solid precipitation in the process water. Furthermore, the solid precipitation is further facilitated by the precipitants and flocculants supplied to the first separation apparatus 130a. The process water treated in the first separation apparatus 130a is led via the process water line 134 into the second separation apparatus 140a designed as a dissolved air flotation apparatus, with further precipitant and flocculant moreover being added to said second separation apparatus via the feed lines 132', 133'. In this respect, the precipitants and flocculants supplied to the second separation apparatus 140a serve for the assistance of the precipitation of the last ions contained in the process water as solids, that is so-to-say for the fine adjustment of the solid precipitation, whereas the predominant portion of the solids or the coarse adjustment of the solid precipitation has already taken place in the first separation apparatus 130a. Furthermore, water in which air has been dissolved under pressure and which is expanded in the second separation apparatus 140a is continuously supplied to the second separations apparatus 140a via the feed line 139. The air contained in the water supplied via the line 139 thereby bubbles out and bubbles from bottom to top in the form of small air bubbles through the water contained in the second separation apparatus 140a, with the bubbles accumulating at the solids suspended in the process water. Due to the reduced density of the air-solid agglomerates thus formed, the latter rise up to the process water level in the second separation apparatus 140a where they are skimmed off and are removed from the second separation apparatus 140a through the solid outflow line 136, whereas the process water liberated from the solids is removed from the second separation apparatus 140a via the outflow line 135. Both a part flow of the process water removed from the second separation apparatus 140a and a part flow of the solids removed from the second separation apparatus 140a are led back into the first separation apparatus 130a via the part flow return lines 137, 138.

The process water treatment unit 116a in accordance with a further embodiment of the present invention shown in FIG. 3 differs from that shown in FIG. 2 in that it does not include any part flow return line for process water, but only a part flow return line 138 for solids which opens into the process water feed line 129. As a further difference, the process water originating from the anaerobic reactor 125a is supplied to the first separation apparatus 130a in its lower region, that is it is conducted in co-flow with the air supplied via the gas distributor 128 through the first separation apparatus 130a. Furthermore, the second separation apparatus 140a of the process water treatment unit 116a shown in FIG. 3 has no feed lines 132', 133' for precipitant or flocculant.

REFERENCE NUMERAL LIST 100 stock/recovered paper treatment apparatus
101a first stage of the stock/recovered paper treatment apparatus
101b second stage of the fiber & recovered paper treatment apparatus
102 raw material inlet
105 pulper/pulping engine
110a, 110b sorting apparatus
112 oxidation unit/reduction unit
115a, 115b deckering unit
116a, 116b process water treatment unit of the stock/recovered paper treatment apparatus
118a, 118b reject treatment unit
120a, 120b stock recovery unit
124 return line
125a, 125b anaerobic reactor
126 propeller agitator/agitator device
127 gas feed line
128 gas distributor
129 feed line for process water
130a, 130b first separation apparatus
131 gas outflow line
132, 132' precipitant feed line
133, 133' flocculant feed line
134 process water line
135 process water outflow line
136 solid outflow line
137 part flow return line for process water
138 part flow return line for solids
139 feed line for water containing compressed air
140a, 140b second separation apparatus
145a, 145b return line
170 line
170a part flow line
200 paper-making machine
202 centrifugal sorter
204 fine sorting apparatus
206 paper-making machine shaping part
208 paper-making machine pressing part
210 drying part
212 reject treatment unit
214 fiber recovery unit
216 process water treatment unit of the paper-making machine
220 material removal unit
225 anaerobic reactor
230 first separation apparatus
240 second separation apparatus
270 return line
270a, 270b part flow line
280 fresh water feed line
300 waste water line
305 mechanical material removal unit
310 cooling unit
315 biological waste water purification unit
400 public waters

The invention claimed is:
1. A method for purifying process water, comprising at least one process water treatment step which includes the following steps:

a) an anaerobic purification step in which process water to be purified is brought into contact with anaerobic microorganisms in an anaerobic reactor to degrade impurities contained in the process water;
b) a first separation step in which gas(es) contained in the process water is/are selectively separated from the process water obtained in step a), wherein the first separation step b) is carried out in a strip tank in which the process water is conducted with air in co-flow or in counter flow through the strip tank and in which the process water and the air are mixed with one another by a mixing device, the air is supplied to the strip tank such that the air bubbles through the process water in the form of air bubbles and the air bubbles have an average size from 150 to 600 µm, and wherein at least 80% of the gas(es) contained in the process water is separated in the first separation step b) and the process water is set during the first separation step b) to a pH between 7.2 and 8.2; and
c) a second separation step in which solids contained in the process water are separated from the process water obtained in step b) by dissolved air flotation, wherein a pressure difference between a pressure applied and an expansion is set to at least 2 bar in the dissolved air flotation.

2. A method in accordance with claim 1, wherein the process water is conducted with air in co-flow from bottom to top through the strip tank and the gas(es) is removed in the upper region of the strip tank.

3. A method in accordance with claim 1, wherein said method is used for continuously purifying process water in the paper making industry.

4. A method in accordance with claim 1, wherein an under pressure is applied in the strip tank during the conducting through of the process water and of the air.

5. A method in accordance with claim 1, wherein the mixing device in the strip tank is a dynamic mixer or a static mixer.

6. A method in accordance with claim 1 wherein the process water is led from bottom to top through the strip tank in the first separation step b), and the process water and the air bubbles are mixed with one another by the mixing device in the strip tank.

7. A method in accordance with claim 1, wherein a part flow is removed from the process water after the second separation step c), this part flow is mixed with the process water after the anaerobic cleaning step a) to obtain a mixture and the mixture thus obtained is subjected to the first separation step b).

8. A method in accordance with claim 1, wherein a portion of the solids separated in the second separation step c) is removed, this portion is mixed with the process water after the anaerobic purification step a) to obtain a mixture and the mixture thus obtained is subjected to the first separation step b).

9. A method in accordance with claim 1, wherein the process water supplied to the process water treatment step comes from a stock preparation apparatus and/or from a paper-making machine.

10. A method in accordance with claim 9, wherein the process water continuously supplied to the process water treatment step comes from at least one stage of a recovered paper treatment apparatus and/or from a paper-making machine.

11. A system for purifying process water which has at least one process water treatment unit, wherein the process water treatment unit comprises:
i) a reactor for anaerobic purification of process water with at least one feed line for supplying process water to be purified into the reactor as well as at least one outflow line for draining purified water from the reactor;
ii) a first separation apparatus arranged downstream of the anaerobic reactor for selectively separating gases from the process water, wherein the first separation apparatus has a feed line for process water connected to the outflow line of the anaerobic reactor, a gas feed line, a gas outflow line and a mixing device and wherein the first separation apparatus includes a strip tank; and
iii) a second separation apparatus for separating solids from the process water arranged downstream of the first separation apparatus and connected to the first separation apparatus via a line, wherein the second separation apparatus includes a dissolved air flotation apparatus which is designed so that the pressure difference between a the pressure application and an expansion amounts to at least 2 bar.

12. A system in accordance with claim 11, wherein the system is used for continuously purifying process water in the paper-making industry.

13. A system in accordance with claim 11, wherein the first separation apparatus includes a strip tank in whose lower region the feed line for process water and the gas feed line open and in whose upper region the gas outflow line is arranged.

14. A system in accordance with claim 11, wherein a part flow return line for process water is provided at the second separation apparatus and opens into the fed line for process water leading to the first separation apparatus.

15. A system in accordance with claim 11, wherein a part flow return line for solids is provided at the second separation apparatus and opens into the feed line for process water leading to the first separation apparatus.

16. A system in accordance with claim 11, wherein the plant includes at least one stock preparation apparatus and/or at least one paper-making machine, with at least one of the process water treatment units being associated with the at least one stock preparation apparatus and/or with the at least one paper-making machine.

17. A system in accordance with claim 16 for the manufacture of paper from recovered paper, wherein the plant includes a recovered paper treatment apparatus as a stock preparation apparatus for manufacturing fibrous material from the recovered paper and/or a paper-making machine for manufacturing paper from the fibrous material, with the recovered paper treatment apparatus having one or more stages and at least one of these stages and/or the paper-making machine including their own process water treatment unit.

* * * * *